J. W. TRUMAN.
Tobacco Pipe.
No 61,283.
Patented Jan. 15, 1867.
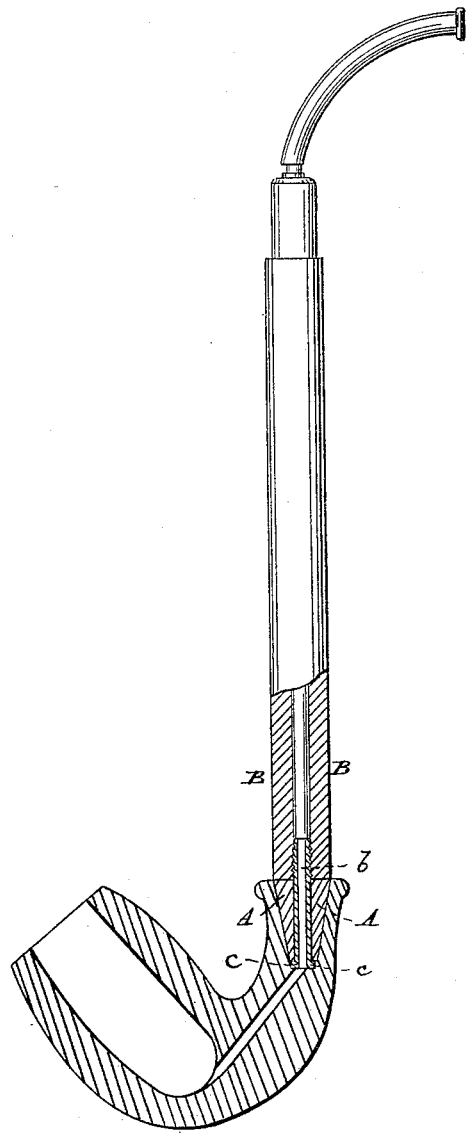

United States Patent Office.

JAMES W. TRUMAN, OF MACON, GEORGIA.

Letters Patent No. 61,283, dated January 15, 1867.

---

TOBACCO PIPE.

---

The Schedule referred to in these Letters Patent and making part of the same.

---

TO ALL WHOM IT MAY CONCERN:

Be it known that I, JAMES W. TRUMAN, of Macon, in the county of Bibb, and State of Georgia, have invented a new and useful improvement in Smoking Pipe; and I do hereby declare that the following is a full, clear, and exact description thereof, which will enable others skilled in the art to make and use the same, reference being had to the accompanying drawing, which represents a side view of my improved pipe, partly in section.

This invention relates to an improvement in the packing of a pipe stem tip, which is so constructed that it will be durable, easy applied, and not liable to drop off.

Heretofore the packings attached to the lower end of the pipe-stem were generally made of cork, an article very liable to break and fall to pieces, when once its pores become saturated with tobacco juice. Moreover, the manner in which the cork is attached to the stem has proved to be very unsatisfactory, as the latter had to be tenoned, when the cork packing was slipped over the tenon. By this arrangement, the end of the wooden stem was not only too much weakened, and very liable to break and split, but also the cork was not secured well enough to the stem to prevent it from dropping off frequently. All these difficulties are completely overcome by my invention, which consists in a rubber packing surrounding a tubular metal screw, which is inserted into the lower end of the stem. The metal tube is provided at its lower end with a flange, which effectively prevents the rubber packing from falling off. By this arrangement I do not only insure better attachment to the stem of the packing, but I also prevent the weakening of the stem; and as the rubber is furthermore greatly superior to the cork packing, as it secures the stem better to the bowl, and is not so liable to break, this improvement will certainly prove very valuable to manufacturers of pipes, as well as to smokers.

The rubber packing A surrounds the metal tube $b$, as seen in the drawings. The tube $b$ is screwed into the end of the pipe-stem B, and is provided at its lower end with a flange, $c$, as shown, whereby the packing A is held firmly between the end of the stem and the said flange.

I claim as new, and desire to secure by Letters Patent, as an improved article of manufacture—

The combination of the flanged tube $b$ and rubber packing A with the pipe-stem B, substantially as and for the purpose herein shown and described.

JAMES W. TRUMAN.

Witnesses:
H. N. ELLS,
N. A. MEGRATH.